United States Patent [19]

Lohrenz et al.

[11] Patent Number: 4,700,909
[45] Date of Patent: Oct. 20, 1987

[54] TAPE DECK HAVING IMPROVED TAPE PATH

[75] Inventors: Marold H. Lohrenz; Joel O. Thies, both of Tulsa; Scott T. Jednacz, Bixby, all of Okla.

[73] Assignee: Telex Computer Products, Inc., Tulsa, Okla.

[21] Appl. No.: 529,280

[22] Filed: Sep. 6, 1983

[51] Int. Cl.⁴ .................. G03B 1/04; G11B 15/58
[52] U.S. Cl. ..................................... 242/182; 226/97
[58] Field of Search ................ 242/182–185, 242/193; 226/97, 118; 360/95, 137

[56] References Cited

U.S. PATENT DOCUMENTS

| | | | |
|---|---|---|---|
| 3,645,471 | 2/1972 | Kjos | 242/182 |
| 3,754,723 | 8/1973 | Meyer | 242/193 |
| 3,761,036 | 9/1973 | Wilson | 242/183 |
| 3,948,459 | 4/1976 | Schoeneman | 242/182 |
| 3,952,968 | 4/1976 | McKinstry et al. | 242/182 |

Primary Examiner—John M. Jillions
Attorney, Agent, or Firm—Head; Johnson; Stevenson

[57] ABSTRACT

A tape deck providing means to drive and control a file reel and a machine reel including a vacuum source and a capstan drive means, the tape deck including a first vacuum column of relatively wide width and short length extending upwardly and at an acute angle to the vertical plane encompassing the axis of the file reel and machine reel, and a second relatively wide, short length vacuum column below the first vacuum column and having an axis intersecting the axis of the first vacuum column at an acute angle, the second vacuum column having a transverse end wall at an angle to the second vacuum column outer wall, the sources of vacuum being applied to the vacuum columns, the capstan being positioned at the entrance to the second vacuum column so that a short length of tape extends from the capstan to the exit of the first vacuum column, the tape being wrapped 180° around the capstan, with a read-write head positioned to engage the tape between the capstan and the exit from to the first vacuum column, the tape path geometry providing improved performance in handling of the tape within the confines of a relatively small area.

5 Claims, 1 Drawing Figure

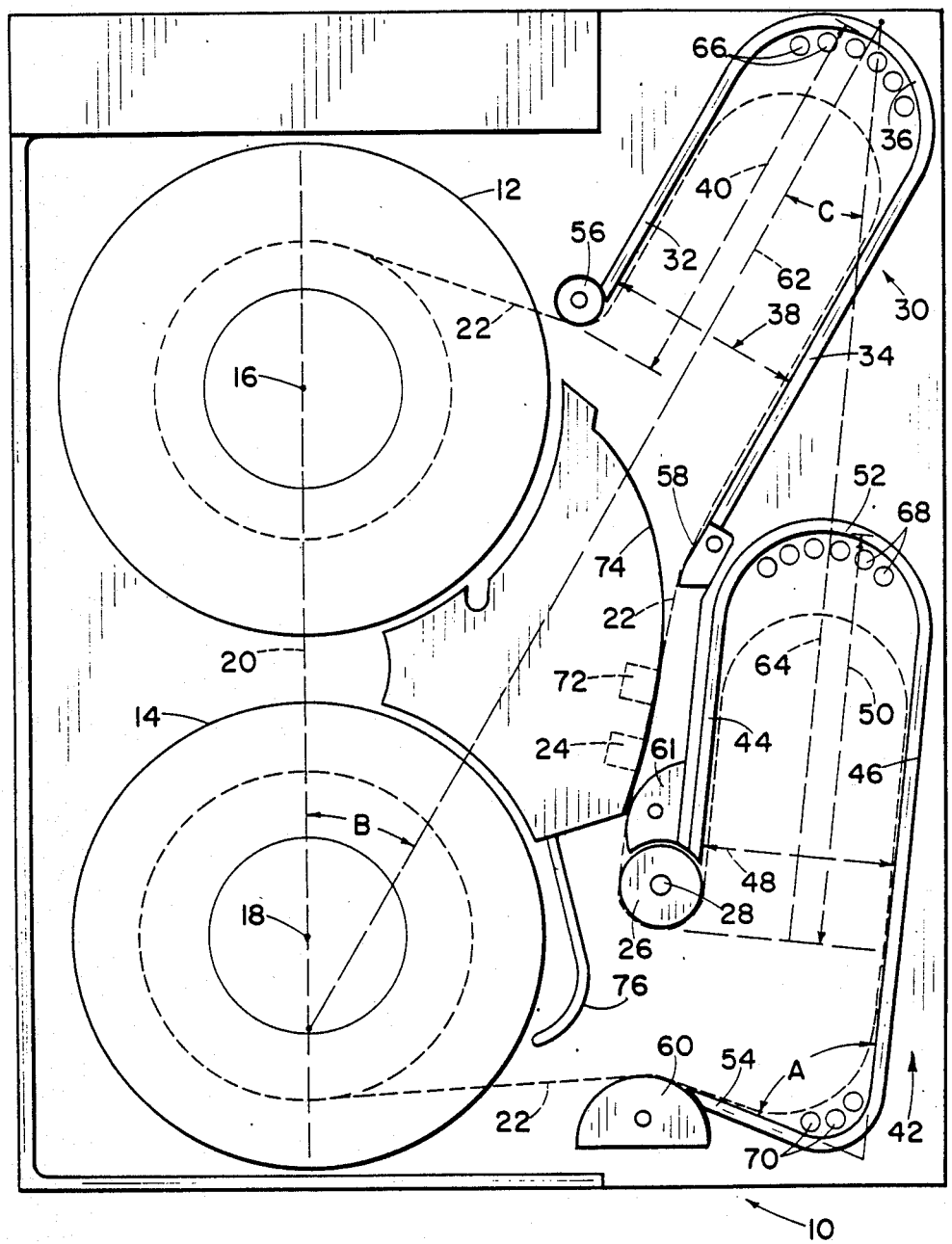

TAPE DECK HAVING IMPROVED TAPE PATH

SUMMARY OF THE INVENTION

The present invention is directed towards an improved tape path geometry for a tape deck as used in a tape drive employed in conjunction with computer apparatus. In the conventional tape transport the tape path is from a file reel through a first vacuum column, past a read-write head, around a capstan, into a second vacuum column and onto a machine reel. The tape is preferably arranged with the oxide side inward so that the oxide side of the tape contacts nothing in the tape path except the head and, if used, a tape cleaner. The forward motion of the tape is from the file reel to a machine reel. Reel servos are used to control the position of the tape loop in both the first and second vacuum columns. The typical tension applied on the tape by a tape drive of this type is about eight ounces.

The present invention is directed towards improvements in the standard tape drive. This invention is a unique tape path geometry, including critical placement and sizing of key elements in the tape path to minimize the power required and to diminish the acoustical noise. The invention provides a high performance tape drive having the inherent dynamic ability to control tape position to provide a short gap to minimize the length of the tape reserved to start and stop recording, thereby maximizing the tape available for data storage. By the application of this invention a tape gap of about 0.3 inches is obtainable for current high density standard tape formats.

The invention provides a tape path geometry in which power is minimized by increasing the vacuum column length and width as much as possible while staying with an overall limited area. For instance, in an actual application of the invention, high performance characteristics have been obtained in a tape drive area, including the supply and machine reels, or about 19 inches by 24⅜ inches.

It has been learned that the power required to operate a tape drive is affected more by column width than column length, varying approximately as the 1.5 power of column width and linearly with column length. In addition, the accoustical noise level is reduced as the width is increased. The present tape path geometry has been derived to advantageously employ these characteristics, by providing relatively wide column widths compared to relatively short column lengths.

The tape path geometry of the present invention achieves the three established criteria for maximum performance in a tape drive that is: (1) maximum wrap on the capstan; (2) minimum tape length in the area of the capstan and head; and (3) a minimum number of degrees of direction changes along the path of the tape. In the geometry of the tape path of this invention the wrap on the capstan is 180°. While others have provided tape drives in which the tape wrap has been 180°, these known systems have typically utilized auxiliary rollers or air bearings to achieve the desired 180° capstan wrap. Some existing designs have obtained a capstan wrap angle of about 145° to 160° where auxiliary rollers or air bearings have not been employed. Since slippage tends to vary exponentially with wrap angle the advantage of the design of the tape path geometry of this invention wherein 180° wrap is achieved is significant. By achieving a high capstan tape wrap angle the necessity of the use of vacuum assist to prevent slippage of the tape on the capstan has been eliminated. The ability to attain a high performance tape drive without the necessity of using a vacuum assist capstan serves to further reduce the power requirements.

The present design minimizes the length of tape in the area of the capstan, particularly between the capstan and the exit from the first vacuum column. In the present design this length is approximately 7.2 inches in the embodiment of the invention wherein the overall dimensions of the transport is 19 inches by 24⅜ inches. This relatively short length of tape which must be handled in the short acceleration intervals greatly improves the deck high speed performance.

The present invention provides a unique layout such that the changes in the direction of the tape path are less dramatic. Because direction changes are accomplished primarily at points wherein the change is an obtuse angle, the use of passive hydrodynamic bearings may be employed whereas others have been required to use air bearings or rollers. The use of passive hydrodynamic bearings provides gentle tape handling and eliminates the power otherwise consumed in supplying air to air bearings. Further, the use of a minimal number of rollers (one) minimizes edge wear on the tape.

A further advantage of the present design is that it provides a straight "drop through" tape path to facilitate threading and the implementation of automatic self-threading capability. Further, the vacuum columns employed utilize semi-circular closed ends which serve to minimize the possibility of tape damage if the tape bottoms-out within the columns. It is critical in the handling of tape that it not be damaged, even in the case of malfunction of the tape drive. The present geometrical design for the tape path provides a system in which the tape will seek a neutral state over the openings of the vacuum ports. This characteristic, when combined with the semi-circular shape of the closed ends of the vacuum columns means that even in a malfunction situation there is no tendency to wrinkle, crush or otherwise cause physical damage to the tape.

DESCRIPTION OF THE DRAWING

The drawing figure is an elevational front view of a tape drive showing the file reel and take-up reel and showing the tape path geometry employed in practicing the invention.

DETAILED DESCRIPTION OF THE PREFERRED EMBODIMENT

A common means employed of storing and retrieving data for use in conjunction with computers is by the use of tape. Tape is an elongated flexible media having a magnetically sensitive coating thereon, such as iron oxide, embodied in such a way that electrical signals may be supplied to and retrieved from the tape by passing the tape past a head. For examples of existing known tape drives and explanations as to their design and function, reference may be had to U.S. Pat. Nos. 3,645,471 and 3,761,036. These are but merely exemplary of a large number of patents as well as other publications which have been distributed relating to the geometry of tape decks. The present invention provides an improved tape path geometry for use with a low speed, high performance type of tape drive and is particularly unique in its effectiveness to provide such high performance characteristics, with low power utilization, in a confined space.

Because of the increasing wide spread use of computers throughout the world, the space requirements have forced manufacturers to consider limiting the geometrical size of various components. For this reason it has become important to provide tape drives of the minimum practical size while still maintaining the necessary performance characteristics.

At the same time, because of the use of increased numbers of components in computer systems the total power consumption has become an important factor. The present invention achieves a high performance tape drive in a minimal space and with substantially reduced power consumption requirements compared to other devices, such as those exemplified in the two above mentioned patents.

Referring to the drawing, a tape deck is generally indicated by the numeral 10. It is typically mounted in a cabinet which rests on a floor with the tape deck 10 at an elevation so as to be handy for use by an operator. The lower portion of the total tape drive is not shown. Doors (also not shown) cover the tape deck end when it is in use, the doors are opened only to put or take off a different file reel 12. As previously indicated, space limitation has become important and the present invention is illustrative of a design in which the total width of the tape deck 10 may be 19 inches with a height of 24⅜ inches.

In addition to the file reel 12 a machine reel 14 is employed which normally remains with the tape drive at all times. The supply reel rotates about its axis 16 and machine reel about its axis 18. Axis 16 and 18 are in a vertical plane indicated by the dotted line 20.

The tape path which is typically attained during operation of the tape drive is indicated by the dotted line 22. The tape path is from the file reel 12 to the machine reel 14 past a read-write head 24. The function of the tape drive is to move the tape 22 past the head 24 in both directions. In typical application the tape is constantly stopped, started in one direction, stopped, started in the other direction, all of which takes place at exceedingly short time intervals. The function of the tape path geometry in the present invention, as is the case in all high performance tape drives, is to make it possible to achieve the rapid acceleration and deceleration of the tape as required.

The tape is moved past head 24 by means of a capstan 26 rotated about its shaft 28. The capstan is driven by a drive motor (not shown) capable of rotating the capstan in one direction, suddenly stop, and rotating it in the opposite direction. The function of the other aspects of the tape drive is to make the length of tape between the capstan and the read-write 24 of a low mass so that the tape can be quickly accelerated and decelerated by the capstan as required.

To accomplish these results, a first or upper vacuum column generally indicated by the numeral 30 is employed. The first vacuum column has a first sidewall 32 and a paralleled second sidewall 34. The sidewalls 32 and 34 have a semi-circular wall 36 closing one end, the other end of the column being opened. The first vacuum column 30 has a width indicated by the dotted line 38 in which is relatively great compared to the length indicated by the dotted line 40. In the preferred embodiment the width 38 is at least about one half of the length 40. This compared with other known tape drives wherein the length of the vacuum column is several times the width of the column.

A second vacuum column generally indicated by the numeral 42 is employed, the second vacuum column being generally below the first, upper column 30. The second vacuum column 42 has a first sidewall 44 and a paralleled second sidewall 46, with a width 48 which is at least about one half of the column length 50.

The second vacuum column 42 has a semi-circular end wall 52 closing one end. The second sidewall 46 is of increased length compared to the first sidewall 44 and is intersected by a transverse end wall 54 opposite the semi-circular end wall 52. The angle between transverse end wall 54 and second sidewall 46, indicated by the letter A, is about 74°. The outer end of wall 44 and the capstan 26 forms the entry into the second vacuum column 42.

Formed at the end of the first end wall 32 of the first vacuum column 30 opposite the semi-circular end 36 is a roller 56. The tape 22 passes over roller 56 to enter into the first vacuum column.

The tape deck employs three hydrodynamic bearings 58, 60 and 61. Hydrodynamic bearing 58 is at the outer end of the first vacuum column second wall 34; bearing 60 is at the outer end of transverse end wall 54; and bearing 61 is adjacent capstan 26 and between the capstan and head 24. Each of these three devices is formed of a very hard wearing surface and configured to provide a radius of curvature of relatively large diameter so that the tape 22 engages the surface asymptotically, that is, at a very acute angle of the tape to the tangent of the hydrodynamic bearing surface at the point of contact. This causes the tape to carry with it as it passes over each of the hydrodynamic bearings a thin film of air which functions to protect the tape against wear. Hydrodynamic bearings 58, 60 and 61 can be employed only when the tape path direction change is small. It can be seen that the tape path direction change at each of the hydrodynamic bearing at a very obtuse angle.

The second hydrodynamic bearing 60 is employed at the outer end of traverse end wall 54 to direct the tape onto the machine reel 14.

The third hydrodynamic bearing 61 is positioned, as previously indicated, adjacent capstan 26 and between it and head 24. Thus the tape is guided into contact with head 24 by hydrodynamic bearings 58 and 61.

The axes of the first vacuum column 30 is indicated by the dotted line 62 and the axes of the second column 42 is indicated by the dotted line 64. The axes 62 of the first column 30 intersects the plane of the axes 20 of the reels 16 and 18 at an angle B. This angle is an acute angle of about 30°. The axis 64 of the second vacuum column 42 intersects the axes 62 of the first vacuum column at an angle C which is about 24°. Thus it can be seen that a tape path geometry is provided in which the vacuum columns are arranged so that the angles B and C are within close proximity to each other.

The geometry of the tape path provides a full 180° wrap of the tape 22 as it passes over capstan 26. As previously indicated, a wrap of 180° is extremely important in the high performance characteristics of the tape path geometry of this invention.

Formed within first vacuum column 30 adjacent the semi-circular end wall 36 are a plurality of vacuum ports 66 and in like manner, adjacent the semi-circular end walls 52 of the second vacuum column 42 are vacuum ports 68. Adjacent the intersection of the second wall 46 and the traverse wall 54 is a third set of vacuum ports 70. Vacuum supplied to ports 66, 68 and 70 serve to retain the tape 22 within the columns and allow fluctuation of the length of the tape as necessary to supply the proper tension on the tape and to permit the supply and take-up of the tape as it moves back and forth between reels 12 and 14.

A tape cleaner 72 is shown adjacent the read-write head 24 for cleaning the tape and is a standard item employed in tape drives. To assist in the shelf-threading operation of the tape, shield 74 and a tape guide 76 are used, however these are not bearing surfaces and are not associated with the normal operation of the tape once the tape has entered into the columns.

The loading of the tape is as follows: A length of tape 22 is spooled from file reel 12, passes around the shield 74, past the write head 24 and tape guide 76 to the machine reel 14. Several wraps of tape are wound on machine reel 14. Vacuum is then supplied to ports 66, 68 and 70 to permit the tape 22 to enter into the columns. The reels are operated to back-off, that is to grant a greater length of tape between the reels. First, the upper column 30 is loaded and then the lower column 42. After the tape has been threaded from the file reel 12 and several turns are wrapped on machine reel 14, both reels are stopped. Then the machine reel 14 is backed-off and a loop of tape is drawn into the upper column 30. The design of the columns and the air flow is such that the upper column is biased to form a loop prior to a loop forming in the lower column 42. Back-off of the machine reel 14 is continued until the tape loop is positioned near vacuum ports 66 in the first column 30 at which time the loop seeks a neutral state. The machine reel 14 is continued to be backed-off supplying more tape and a loop is then drawn into the lower column 42. Tape guide 76 retains the tape in proximity to the opening into second column 42 so that it will be pulled by vacuum into the column. Once the loop is formed in the lower column the machine reel is stopped. The file reel 12 is then positioned to move the loop in the upper column from near the port 66 towards the center of the column to approximately that shown in dotted outline, which is the normal loaded position. The tape is now properly loaded within the columns and ready for operation.

It can be seen that the tape path geometry provided herein is a substantial departure from the geometry employed in known devices. While many tape drives employ the basic elements of a file reel, a machine reel, a capstan, and vacuum columns to regulate the tension on the tape, the present design optimizes these necessary elements into a minimum, compact state and one requiring substantially minimal power. No air bearings are employed and the capstan does not have to be supplied by vacuum to achieve adequate drive of the tape since it is wrapped by a full 180° peripheral contact with the tape. Only a single roller is employed.

As previously indicated, the relationship of components in the tape drive geometry are such that angle A is about 74°, angle B is about 30° and angle C is about 24°. In practicing the invention angle A can vary from about 65° to 80°, angle B from 20° to 40°, and angle C from about 15° to 35°.

While the invention has been described with a certain degree of particularity it is manifest that many changes may be made in the details of construction and arrangement of components without departing from the spirit and scope of this disclosure. It is understood that the invention is not to be limited to the specific embodiments set forth herein for purposes of exemplification, but that it is to be limited only by the scope of the attached claim or claims including the full range of equivalency of each step or element thereof.

What is claimed is:

1. In a magnetic tape handling system including having a vacuum source and a capstan drive means, an improved tape deck comprising:
    a machine reel for receiving tape wound thereon;
    a file reel having tape wound thereon, the axes of said machine and file reels lying in a vertical plane;
    a first vacuum column having a first sidewall and a paralleled second sidewall, having a semi-circular wall closing one end, the other end being opened, at least one vacuum port communicating with the first column adjacent the semi-circular end wall;
    a tape roller at the outer end of said first vacuum column first sidewall;
    a second vacuum column having a first sidewall and a paralleled second sidewall, having a semi-circular wall closing one end, at least one vacuum port communicating with said second column adjacent said semi-circular end wall, the second sidewall being of length longer than said first sidewall, and a transverse end wall extending from said second sidewall at the end thereof opposite said semicircular wall, the outer end of said transverse sidewall and the end of said first sidewall forming a side opening into said second vacuum column, at least one vacuum port being positioned adjacent the intersection of said second column second wall and said transverse wall;
    a capstan at the end of said second vacuum column first sidewall, the peripheral surface of said capstan being substantially coincident with the plane of said second vacuum column first sidewall, tape being extended from said file reel, within said first vacuum column, past said capstan, within said second vacuum column and to said machine reel; and
    a first hydrodynamic bearing at the outer end of said first vacuum column second sidewall;
    a second hydrodynamic bearing, positioned between said capstan and said first hydrodynamic bushing, a portion of the tape path lying in a plane from said second hydrodynamic bearing and said first hydrodynamic bearing, such tape path plane and the plane of said first column second sidewall intersecting at an obtuse angle;
    a head having an active surface positioned to slightly deflect tape in the position of the tape path from said first to said second hydrodynamic bearing whereby tape moving in such tape path engages the head;
    a third hydrodynamic bearing at the outer end of said transverse end wall; and
    at least one vacuum port communicating with said second column adjacent the intersection of said second column second sidewall and said transverse wall.

2. The improved tape deck according to claim 1 wherein the tape contacts said capstan over at least about 180° of the capstan's peripheral surface.

3. The improved tape deck according to claim 1 wherein the plane of the longitudinal axis of said second column is at an obtuse angle to the plane of said reel axis.

4. A magnetic tape handling system according to claim 1 wherein the longitudinal axis of said first vacuum column intersects the vertical plane of said machine and file reels at an angle B of about 20° to 40°, wherein the longitudinal axis of said second vacuum column intersects the longitudinal axis of said first vacuum column at an angle C of about 15° to 35°, and wherein said second vacuum column second sidewall intersects said transverse wall at an angle A of about 65° to 80°.

5. A magnetic handling system according to claim 4 wherein said angle B is about 30°, said angle C is about 24° and said angle A about 74°.

* * * * *